Dec. 22, 1925.  
J. W. GRAHAM  
AUTOMOBILE SEARCHLIGHT  
Filed Jan. 13, 1925  
1,566,593  
3 Sheets-Sheet 1
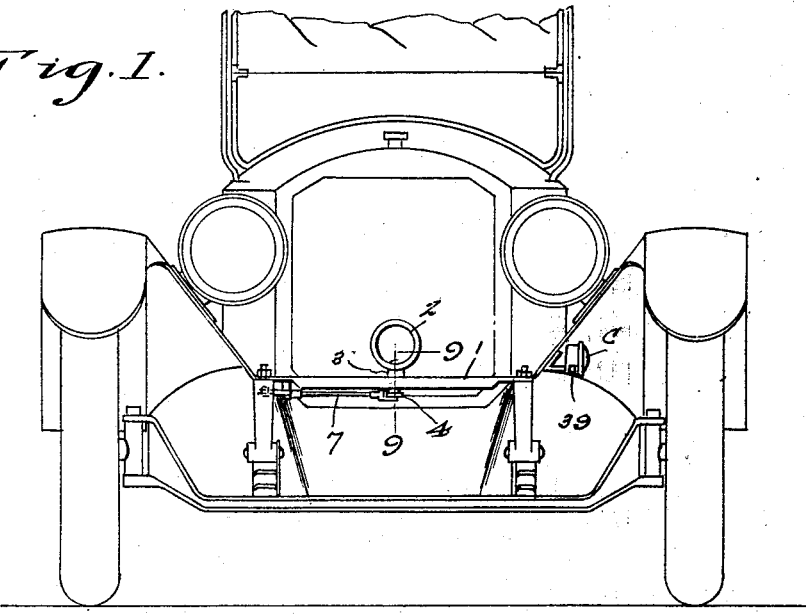
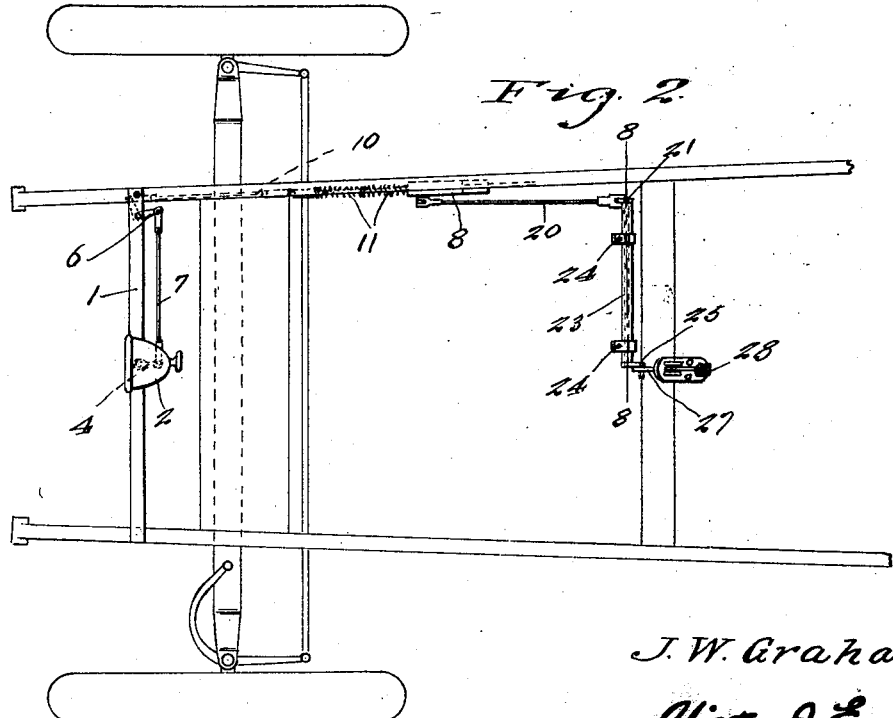

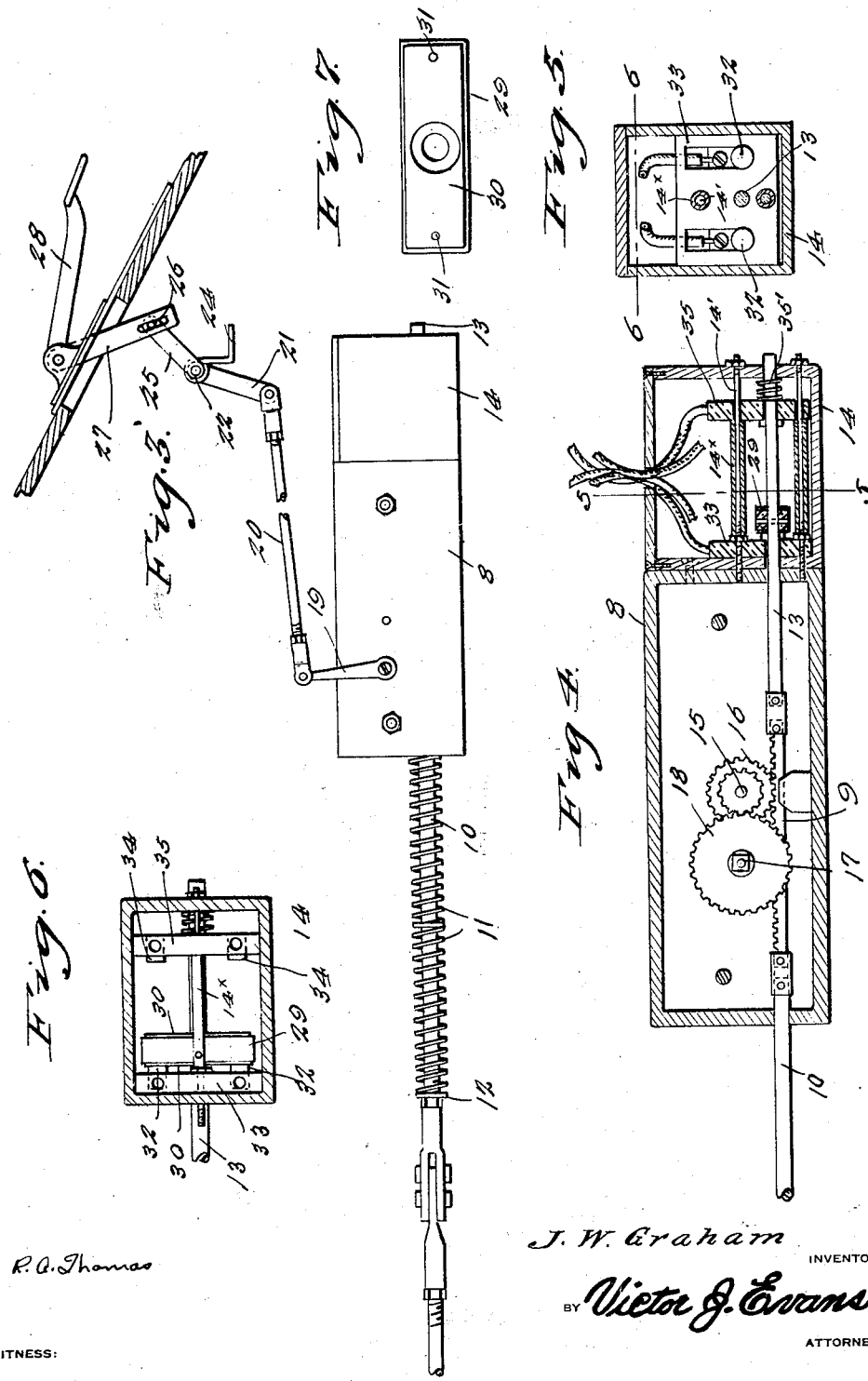

Dec. 22, 1925.
J. W. GRAHAM
1,566,593
AUTOMOBILE SEARCHLIGHT
Filed Jan. 13, 1925　　　3 Sheets-Sheet 3
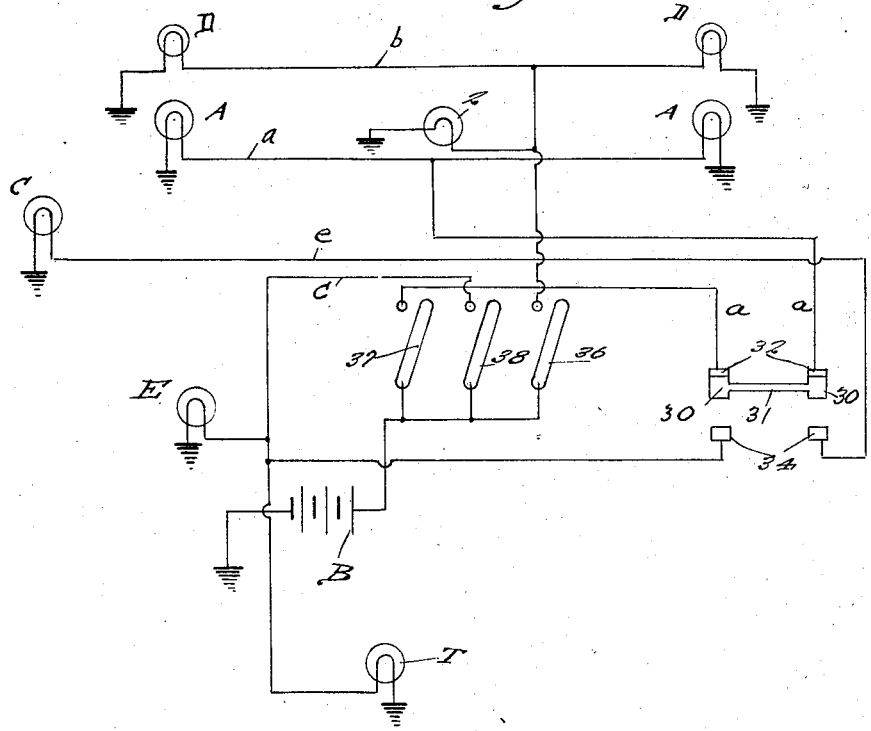
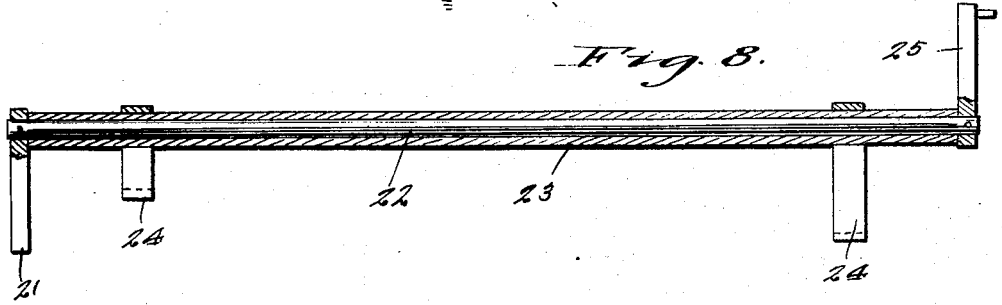
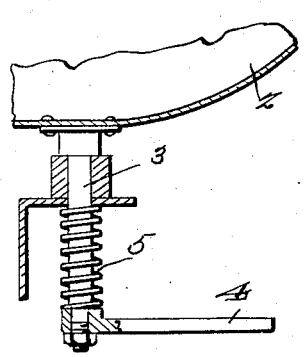
J. W. Graham
INVENTOR
BY Victor J. Evans
ATTORNEY
R. Q. Thomas
WITNESS:

Patented Dec. 22, 1925.

1,566,593

UNITED STATES PATENT OFFICE.

JAMES WALTER GRAHAM, OF NELSONVILLE, OHIO.

AUTOMOBILE SEARCHLIGHT.

Application filed January 13, 1925. Serial No. 2,222.

*To all whom it may concern:*

Be it known that I, JAMES WALTER GRAHAM, a citizen of the United States, residing at Nelsonville, in the county of Athens and State of Ohio, have invented new and useful Improvements in Automobile Searchlights, of which the following is a specification.

This invention relates to improvements in the lighting system of a motor vehicle, the general object of the invention being to provide a search light at the front of the vehicle with manually operated means for turning the lamp to direct the rays of light therefrom to the near side of the road upon the approach of another vehicle to prevent blinding of the driver of the other vehicle while illuminating the near side of the road.

A further object of the invention is to provide means for breaking the circuit of the bright lamps of the vehicle when the search lamp is turned.

Another object of the invention is to provide means for illuminating the fender and front wheel at the left hand side of the vehicle at the same time that the search lamp is turned and the bright lamps are extinguished so that the approaching driver can readily see that part of the vehicle which is closest to him.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of a vehicle showing my invention in use.

Figure 2 is a plan view of a chassis of a vehicle and showing the search lamp and the means for turning the same.

Figure 3 is an enlarged elevation with parts in section of the means for turning the lamp.

Figure 4 is a longitudinal sectional view through the casing which encloses the rack means.

Figure 5 is a section on line 5—5 of Figure 4.

Figure 6 is a section on line 6—6 of Figure 5.

Figure 7 is a view of the movable switch part.

Figure 8 is a section on line 8—8 of Figure 2.

Figure 9 is a section on line 9—9 of Figure 1.

Figure 10 is a diagrammatic view of the circuits.

In these views 1 indicates a bar which is placed across the front of the vehicle with its ends bolted or otherwise fastened to the front part of the vehicle frame in front of the radiator. A search lamp 2 is supported at the center of this bar by having its standard 3 held in a bearing carried by the bar so that the lamp can be rocked about a vertical axis. An arm 4 is connected with the lower end of the standard and a spring 5 is placed on the standard between the arm and the bar to absorb shocks and hold the parts steady. A bell crank 6 is pivoted to the bar adjacent one end thereof and a link 7 connects this bell crank with the arm 4. A casing 8 is fastened to one of the side bars of the frame of the vehicle and a rack bar 9 is arranged in said casing and one end of this rack is connected by the links 10 with the bell crank 6. The links are pivotally connected together and are formed so that they can be adjusted as to their length and one of the links carries springs 11 which are placed between a washer 12 on the link and the end of the casing and these springs tend to hold the parts with the rack in its forward position and the lamp in a position where the rays of light therefrom will be directed straight ahead in front of the vehicle, as shown in Figure 2. A rod 13 is pivoted to the rear end of the rack bar 9 and passes through a hole in the rear end of the casing 8 and through holes in a casing 14 which is fastened to the end of the casing 8. A shaft 15 is rotatably mounted in the casing 8 and has secured thereto a toothed wheel 16 which engages with the rack 9. A second shaft 17 is journaled in the casing 8 and the shafts 15 and 17 are geared together by the gears 18. The shaft 17 has one end extending through the casing and this end has secured thereto an arm 19 which is connected by an adjustable link 20 with an arm 21 on a shaft 22 which is journaled in the sleeve-like bearing 23, supported by the clips 24 which are connected with a part of the vehicle.

An arm 25 is connected with the other end of the shaft 22 and this arm is connected by a pin and slot connection 26 with an arm 27 of a pedal 28 which is mounted on the floor of the vehicle. Thus by pressing upon the pedal 28 the parts will be moved to rock the shaft 17 and this movement of the shaft 17 will be communicated to shaft 15 through the gears 18 to cause the wheel 16 to slide the rack bar rearwardly and thus turn the lamp 2, through the connections specified, so that the rays of light therefrom will be directed toward the right hand side of the road. As soon as the foot is removed from the pedal, the springs will return the parts to normal position with the lamp 12 pointing straight ahead.

A switch block 29 is fastened to the bar 13 and is arranged in the casing 14. This block carries a pair of contact plates 30, one on each side of the block, the plates being held in place by the pins 31. A pair of contacts 32 are carried by a block 33 at the inner end of the casing 14 and another pair of contacts 34 are carried by a block 35, which is slidably supported on the rods 14' and is yieldably held against the spacers 14<sup>x</sup> on the rods by a spring 35' on the rod 13. This arrangement not only acts as a shock absorber but also provides means for adjusting the space between the blocks 33 and 35 by placing spacers on the rods 14' of the desired length. The contacts on the blocks 33 and 35 are adapted to be engaged by the contacts 30 on the block 29, the contacts 30 engaging the contacts 32 when the parts are in normal position and said contacts 30 engaging the contacts 34 when the pedal has been depressed to turn the lamp. The contacts 32 are arranged in the circuit a of the bright lamps A of the vehicle so that when the search lamp is turned by operation of the foot pedal, the circuit to the bright lamps is broken. The lamp 2 is located in the circuit b of the dim lamps D so that when the switch 36 is closed the circuit b to the dimmer lamps D and to lamp 2 will be closed to the battery B. The main switch for the bright light circuit is shown at 37 and the switch 38 controls the circuit c for the tail lamp T and the dash lamp E.

A lamp C is fastened to the left hand side of the vehicle adjacent the front thereof and in the position to illuminate the left front wheel and its fender. This lamp is preferably provided with a red lens in its front and with a window 39 in its bottom so that the lamps will illuminate the wheel and fender with a red light and the ground immediately in front of the car with a white light, thus enabling a driver of a car approaching the car provided with the lamp to clearly see the part of the car nearest to him and thus obviate danger of running into the car.

This lamp has its circuit e connected with the contacts 34 and with the circuit c so that it will not be lighted until the switch 38 for controlling the tail lamp circuit is closed.

From the foregoing it will be seen that I have provided a search light for fully illuminating the road ahead of a vehicle which can be used in addition to the headlamps of the car, with means for extinguishing the bright lamps of the headlamps and turning the search light so that its rays will strike the near side of the road when another vehicle approaches the first vehicle so that the driver of an approaching car will not be blinded by the bright lights of the first vehicle. By directing the rays of the search light to the side of the road the driver can see the edge of the road and objects thereon and thus danger of running off the road or striking persons at the edge of the road is obviated.

The lamp C, which I prefer to call a courtesy lamp, illuminates the left hand side of the vehicle and the road adjacent thereto so that the driver of the approaching car can clearly see the part of the first car which it comes nearest to in passing. This courtesy lamp will not be lighted until the foot pedal is depressed to swing the search lamp and extinguish the bright lamps of the headlights.

While the drawings show the device applied to a car with three switches 36, 37 and 38 it will, of course, be understood that it can be applied to cars equipped with other types of illuminating systems with but slight change.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a motor vehicle, a bar extending across the front of the frame thereof in front of the radiator, a search lamp supported at the center of the bar, means for permitting the lamp to be moved about a vertical axis, a bell crank on the bar, links connecting the same with the bell crank, a casing enclosing the rack bar, a shaft journaled in the casing, a toothed wheel thereon engaging the rack bar, a second shaft journaled in the casing, gears connecting the two shafts together, an arm on the second shaft, a foot pedal, means for connecting the pedal with the arm so that the depression of the pedal will rock the shaft to cause the toothed wheel to move the rack bar, springs associated with the parts for holding the lamp in a straight position and the pedal bar in raised position and switch means associated with the rack bar for extinguishing the bright lamps of the vehicle when the foot pedal is depressed to turn the search lamp.

2. In a motor vehicle, a cross bar at the front thereof, a search lamp supported thereby to move about a vertical axis, a rack bar, means for connecting the rack bar with the lamp so that the lamp will be turned on its axis by the movement of the rack bar, a pedal, means for connecting the same with the rack bar to move the rack bar by the depression of the pedal, a lamp for illuminating the front left wheel and fender of the vehicle and switch means associated with the rack bar for closing the circuit to said lamp and extinguishing the circuit of the bright headlamps when the pedal is depressed to turn the search lamp.

In testimony whereof I affix my signature.

JAMES WALTER GRAHAM.